United States Patent
Apte et al.

(10) Patent No.: US 9,569,248 B2
(45) Date of Patent: *Feb. 14, 2017

(54) DEPLOYING VIRTUAL MACHINE INSTANCES OF A PATTERN TO REGIONS OF A HIERARCHICAL TIER USING PLACEMENT POLICIES AND CONSTRAINTS

(71) Applicant: International Business Machines Corporation, Armonk, NY (US)

(72) Inventors: Ajay A. Apte, Austin, TX (US); Roy F. Brabson, Raleigh, NC (US); Theodore O. Kirby, Raleigh, NC (US); Scott C. Moonen, Holly Springs, NC (US); Donald R. Woods, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 110 days.

This patent is subject to a terminal disclaimer.

(21) Appl. No.: 14/684,366

(22) Filed: Apr. 11, 2015

(65) Prior Publication Data

US 2016/0055024 A1 Feb. 25, 2016

Related U.S. Application Data

(63) Continuation of application No. 14/463,760, filed on Aug. 20, 2014, now Pat. No. 9,262,144.

(51) Int. Cl.
*G06F 9/455* (2006.01)
*G06F 9/445* (2006.01)
*H04L 29/08* (2006.01)

(52) U.S. Cl.
CPC .............. *G06F 9/45558* (2013.01); *G06F 8/60* (2013.01); *H04L 67/10* (2013.01); *G06F 2009/4557* (2013.01); *G06F 2009/45595* (2013.01)

(58) Field of Classification Search
CPC G06F 8/60; G06F 9/45558; G06F 2009/4557; G06F 2009/45595; H04L 67/10

(Continued)

(56) References Cited

U.S. PATENT DOCUMENTS 8,386,838 B1  2/2013  Byan
8,490,150 B2  7/2013  Hadar et al.

(Continued)

OTHER PUBLICATIONS

Mell et al., "The NIST Definition of Cloud Computing," Special Publication 800-145, Sep. 2011, pp. 1-7.

(Continued)

*Primary Examiner* — Qing Chen
(74) *Attorney, Agent, or Firm* — Robert A. Voigt, Jr.; Winstead, P.C.

(57) ABSTRACT

A method, system and computer program product for deploying a pattern. A placement engine of a hierarchical tier selects the region(s) of a next lower tier based on placement policies and constraints at the next lower tier and availability of the artifacts required by the virtual machine instance(s) in the next lower tier utilizing the summarization of resource usage and availability at the next lower tier. The placement engine at the lowest tier selects the compute node(s) in the selected region(s) of the lowest tier to place the virtual machine instances of the pattern based on placement policies and constraints at the compute node level and availability of the artifacts required by the virtual machine instance(s) of the pattern in the compute node level. In this manner, the virtual machine instances of the pattern can be effectively deployed when the resources of the cloud environment are large and geographically dispersed.

7 Claims, 9 Drawing Sheets

(58) Field of Classification Search
USPC .................................... 718/1; 717/168–178
See application file for complete search history.

(56) References Cited

U.S. PATENT DOCUMENTS

| | | |
|---|---|---|
| 8,572,138 B2 | 10/2013 | Sundar et al. |
| 8,590,005 B2 | 11/2013 | Payne, Jr. et al. |
| 2007/0233698 A1 | 10/2007 | Sundar et al. |
| 2011/0072486 A1 | 3/2011 | Hadar et al. |
| 2012/0317569 A1 | 12/2012 | Payne, Jr. et al. |
| 2013/0185667 A1 | 7/2013 | Harper et al. |
| 2014/0006482 A1 | 1/2014 | Raghu et al. |
| 2014/0059310 A1 | 2/2014 | Du et al. |
| 2014/0157262 A1 | 6/2014 | Hicks et al. |
| 2015/0074679 A1 | 3/2015 | Fenoglio et al. |
| 2015/0128131 A1* | 5/2015 | Cao .................... G06F 9/45533 718/1 |
| 2016/0034292 A1* | 2/2016 | Cao .................... G06F 9/45558 718/1 |

OTHER PUBLICATIONS

Tordsson et al., "Cloud Brokering Mechanisms for Optimized Placement of Virtual Machines Across Multiple Providers," Future Generation Computer Systems, vol. 28, Issue 2, Feb. 2012, pp. 358-367.
Sandy Walsh, "MultiClusterZones," https://wiki.openstack.org/wiki/MultiClusterZones, 2014, pp. 1-12.
"Deploying Applications with AWS CloudFormation," http://docs.aws.amazon.com/AWSCloudFormation/latest/UserGuide/deploying.applications.html, 2014, pp. 1-9.
List of IBM Patents or Patent Applications Treated as Related, Apr. 11, 2015, pp. 1-2.

* cited by examiner

DEPLOYING VIRTUAL MACHINE INSTANCES OF A PATTERN TO REGIONS OF A HIERARCHICAL TIER USING PLACEMENT POLICIES AND CONSTRAINTS

TECHNICAL FIELD

The present invention relates generally to cloud computing, and more particularly to deploying virtual machine instances of a pattern to regions of a hierarchical tier using placement policies and constraints.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

In a virtualized computer environment, such as may be implemented in a physical cloud computing node of the cloud computing environment, the virtualized computer environment includes a virtual operating system. The virtual operating system includes a common base portion and separate user portions that all run on a physical computer. The physical computer is referred to as a host. The common base portion may be referred to as a hypervisor and each user portion may be called a guest. Each guest is a logical partition of the physical resources of the computer. A guest operating system runs on each guest, and the guest appears to the guest operating system as a real computer. Each guest operating system may host one or more virtual machines.

An administrator of the cloud computing environment may build a reusable pattern which defines the topology and application environment used to service the customer (i.e., the user receiving the services provided by the cloud computing environment) as well as satisfies the customer requirements, such as application and processing requirements. The pattern is an abstract model of the topology and application environment that encapsulates the installation, configuration and management of middleware and applications, such as the middleware and applications that run on the virtual machines in the physical cloud computing nodes. Such a pattern can be deployed repeatedly thereby avoiding the need to provision these environments individually and manually.

Currently, such a pattern is deployed to compute nodes (e.g., servers) of the cloud computing nodes by a placement engine. The placement engine is configured to select the "best" compute nodes to deploy the pattern, such as the compute nodes to place the virtual machine instances of the pattern. Typically, the placement engine selects the best compute nodes to deploy the pattern utilizing the known state of the physical and virtual resources in the cloud computing environment. However, such an approach is not effective when the physical and virtual resources of the cloud computing environment are extremely large and geographically dispersed since it will become impossible for the placement engine to know the state of the physical and virtual resources in such a cloud computing environment.

BRIEF SUMMARY

In one embodiment of the present invention, a method for deploying a pattern comprises invoking a placement engine to place one or more virtual machine instances of the pattern in one or more compute nodes of a cloud computing environment. The method further comprises selecting one or more regions of a second tier to place the one or more virtual machine instances of the pattern based on placement policies and constraints at the second tier and availability of artifacts required by the one or more virtual machine instances of the pattern in the second tier. The method additionally comprises selecting one or more regions in a third tier within the selected one or more regions of the second tier to place the one or more virtual machine instances of the pattern based on placement policies and constraints at the third tier and availability of artifacts required by the one or more virtual machine instances of the pattern in the third tier. In addition, the method comprises selecting, by a processor, one or more compute nodes in the selected one or more regions of the third tier to place the one or more virtual machine instances of the pattern based on placement policies and constraints at a compute node level and availability of artifacts required by the one or more virtual machine instances of the pattern in the compute node level.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
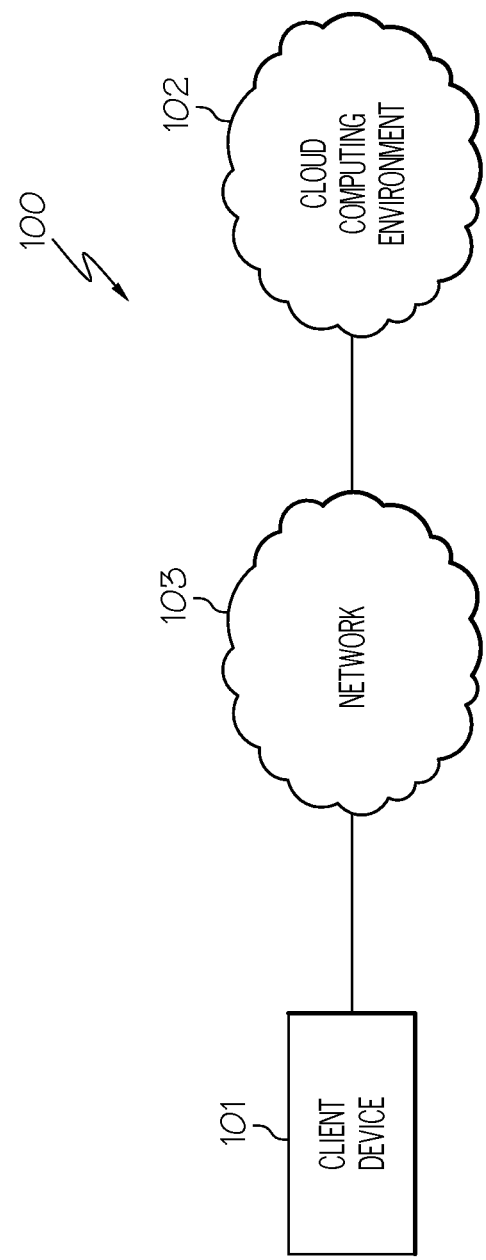
FIG. 1 illustrates a network system configured in accordance with an embodiment of the present invention.

The present invention comprises a method, system and computer program product for deploying a pattern. A pattern engine invokes a placement engine to place virtual machine instance(s) of the pattern in compute node(s) of a cloud computing environment. The placement engine of a first tier selects one or more regions of a second tier (e.g., one or more sites within a region) to place the virtual machine instance(s) of the pattern based on placement policies and constraints at the second tier and availability of the required artifacts by the virtual machine instance(s) in the second tier utilizing the summarization of resource usage and availability at the second tier. Placement policies refer to the placement restrictions for the virtual machine instance(s) of the pattern. Constraints define the relationships between the various virtual machines in the pattern, such as determining whether the various virtual machines in the pattern are to be collocated or anti-collocated with respect to each other. Artifacts refer to the specification of a physical piece of information that is used by the virtual machine instances, such as model files, source files, scripts and binary executable files. The placement engine of a second tier selects one or more regions in a third tier within the selected one or more regions of the second tier (e.g., one or more racks within a site) to place the virtual machine instance(s) of the pattern based on placement policies and constraints at the third tier and availability of required artifacts by the virtual machine instance(s) of the pattern in the third tier. Furthermore, the placement engine of a third tier selects one or more compute nodes in the selected one or more regions of the third tier to place the virtual machine instances of the pattern based on placement policies and constraints at a compute node level and availability of required artifacts by the virtual machine instance(s) of the pattern in the compute node level. In this manner, by implementing such a hierarchical arrangement of tiers, a pattern, including the virtual machine instances of the pattern, can be effectively deployed when the physical and virtual resources of the cloud computing environment are extremely large and geographically dispersed.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
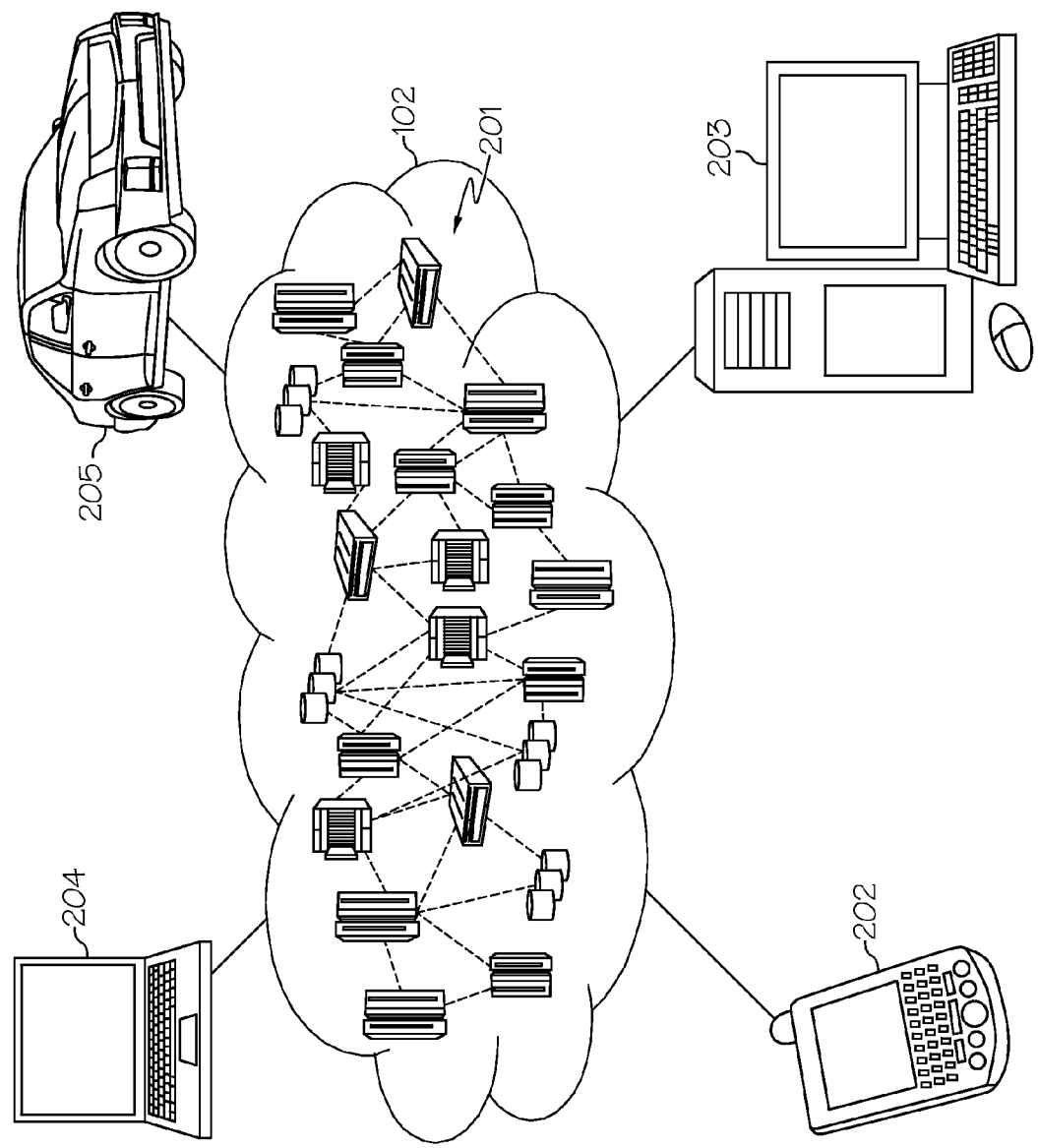
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 (also referred to as "clusters") with which local computing devices used by cloud consumers, such as, for example, Personal Digital Assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. Cloud computing nodes 201 may include one or more racks of compute nodes (e.g., servers) that are managed by a server (referred to herein as the "administrative server") in cloud computing environment 102 as discussed below in greater detail in connection with FIG. 3.

It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing nodes 201 may store program code on a computer readable storage medium on the server computer. The server computer may download the program code to computing device 202, 203, 204, 205 for use on the computing device.

Figure 3:
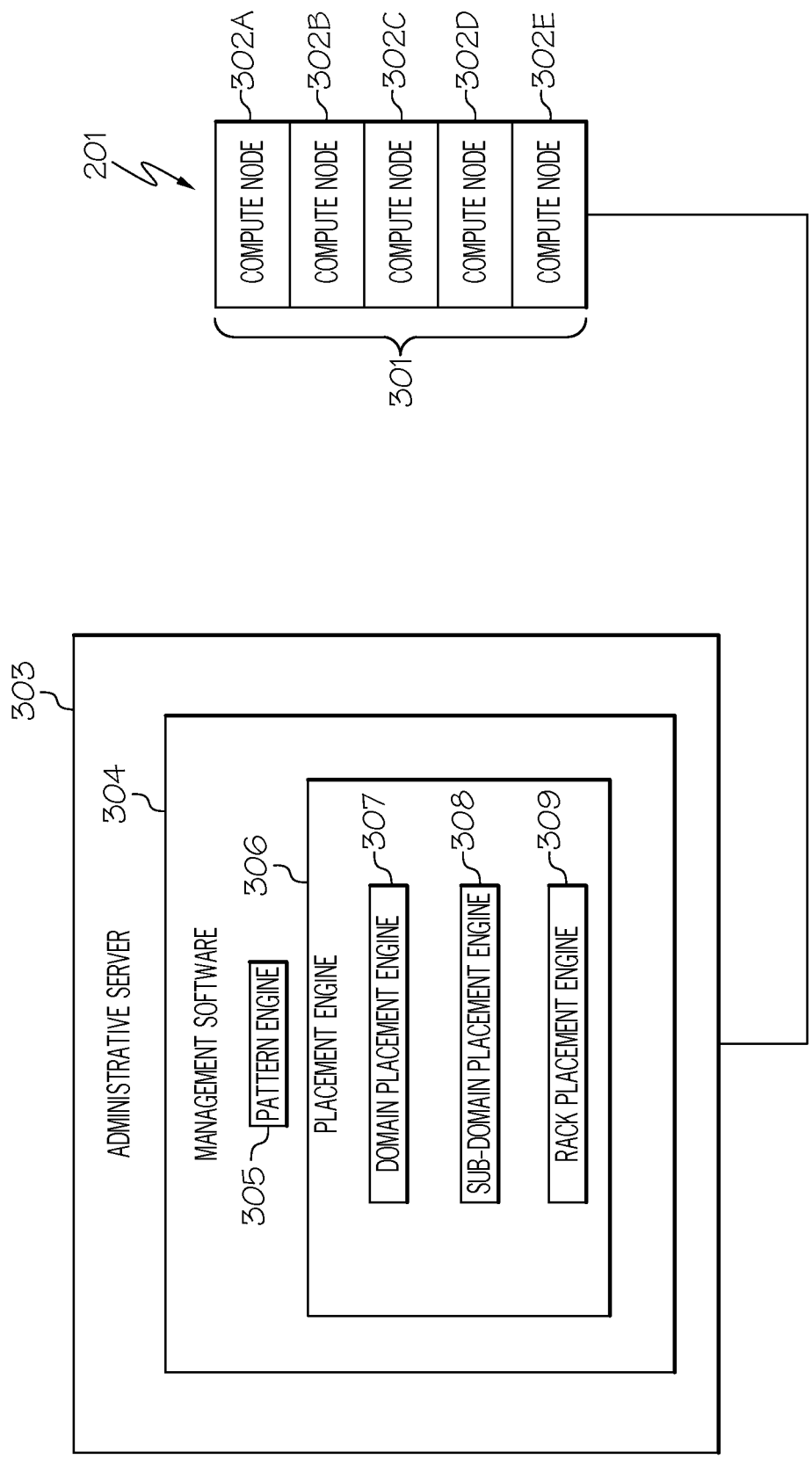
FIG. 3 illustrates a schematic of a rack of compute nodes of the cloud computing node that is managed by an administrative server in accordance with an embodiment of the present invention.

Referring now to FIG. 3, FIG. 3 illustrates a schematic of a rack of compute nodes (e.g., servers) of a cloud computing node 201 that are managed by an administrative server in accordance with an embodiment of the present invention.

As shown in FIG. 3, cloud computing node 201 may include a rack 301 of hardware components or "compute nodes," such as servers or other electronic devices. For example, rack 301 houses compute nodes 302A-302E. Compute nodes 302A-302E may collectively or individually be referred to as compute nodes 302 or compute node 302, respectively. An illustrative virtualization environment for compute node 302 is discussed further below in connection with FIG. 5. FIG. 3 is not to be limited in scope to the number of racks 301 or compute nodes 302 depicted. For example, cloud computing node 201 may be comprised of any number of racks 301 which may house any number of compute nodes 302. Furthermore, while FIG. 3 illustrates rack 301 housing compute nodes 302, rack 301 may house any type of computing component that is used by cloud computing node 201. Furthermore, while the following discusses compute node 302 being confined in a designated rack 301, it is noted for clarity that compute nodes 302 may be distributed across cloud computing environment 102 (FIGS. 1 and 2).

As further shown in FIG. 3, rack 301 is coupled to an administrative server 303 configured to provide data center-level functions. Administrative server 303 supports a module, referred to herein as the management software 304, that can be used to manage all the compute nodes 302 of cloud computing node 201, monitor system utilization, intelligently deploy images of data and optimize the operations of cloud computing environment 102. A description of the hardware configuration of administrative server 303 is provided further below in connection with FIG. 6.

Management software 304 includes a module referred to herein as the "pattern engine" 305. Pattern engine 305 is configured to build a pattern. A "pattern," as used herein, refers to an abstract model of the topology and application environment that encapsulates the installation, configuration and management of middleware and applications, such as the middleware and applications that run on the virtual machines. Such a pattern can be deployed repeatedly thereby avoiding the need to provision these environments individually and manually. In one embodiment, the pattern includes one or more virtual machine instances.

Management software 304 further includes a module referred to herein as the "placement engine" 306. Placement engine 306 is configured to select computer node(s) 302 to place the virtual machine instance(s) of the pattern based on the placement polices and constraints provided by the user (i.e., the customer receiving the services provided by the cloud computing environment) and availability of the artifacts required by the virtual machine instance(s) at each of the tiers in a hierarchical arrangement as discussed further below. Artifacts refer to the specification of a physical piece of information that is used by the virtual machine instances, such as model files, source files, scripts and binary executable files. Placement policies refer to the placement restrictions for the virtual machine instance(s) of the pattern. For example, the user (i.e., the customer receiving the services provided by the cloud computing environment) may select a high availability policy thereby preferring to distribute a workload across multiple regions, sites and compute nodes 302. In another example, the user may instead select an energy conservation policy thereby preferring to place the virtual machine instance(s) on the same compute node 302 at the same site. Constraints define the relationships between the various virtual machines in the pattern, such as determining whether the various virtual machines in the pattern are to be collocated or anti-collocated with respect to each other. Constraints may be "hard" (meaning must be met) or "soft" (meaning "best effort" may be used). The placement polices and constraints may be specifically defined for each level in a hierarchical arrangement, such as a hierarchical arrangement that includes multiple tiers. For example, the highest tier may be a region, the next lower tier may be the sites within the region and the next lower tier may be the racks within each of the sites. As will be discussed in further detail below, such a hierarchical arrangement may be utilized to select the best compute nodes 302 to deploy the pattern when the physical and virtual resources of the cloud computing environment are extremely large and geographically dispersed. An illustrative example of such a hierarchical arrangement is shown in FIG. 4.

Figure 4:
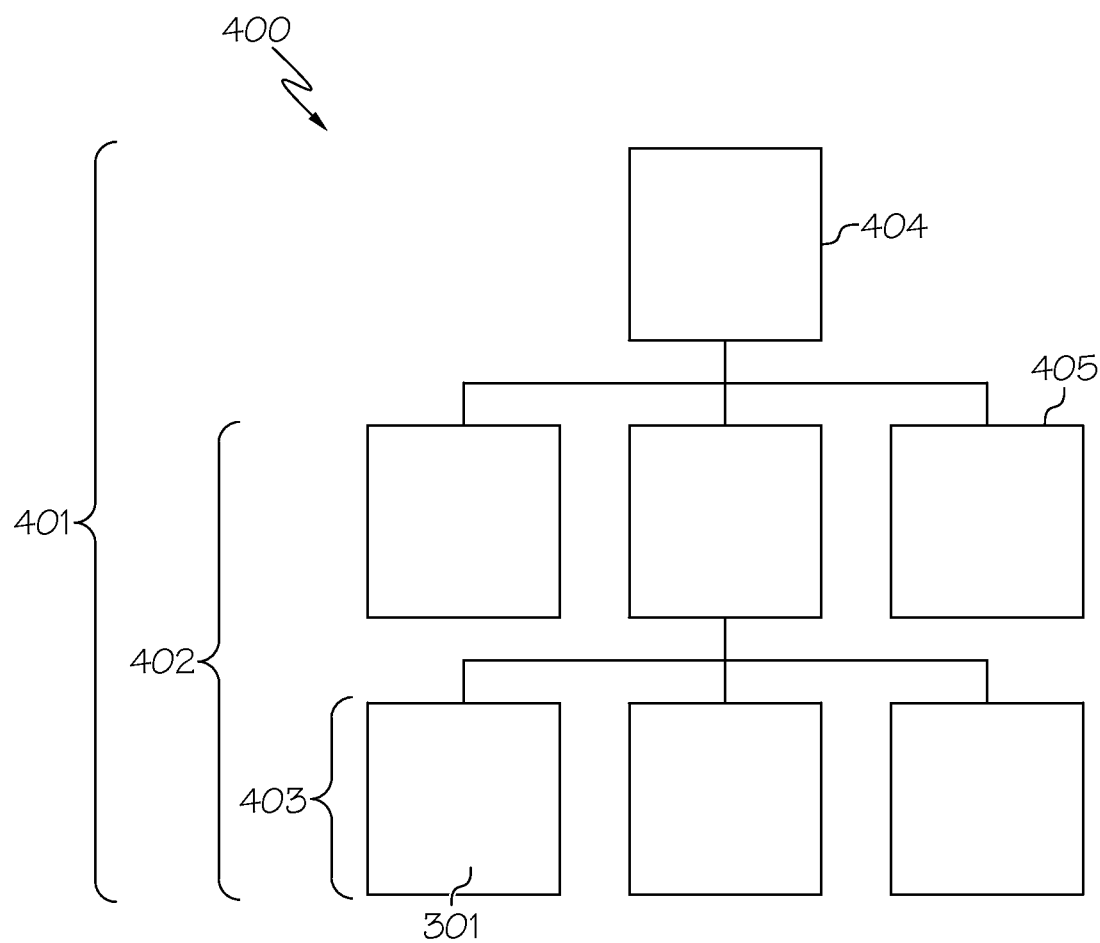
FIG. 4 illustrates a hierarchical arrangement of tiers that is utilized to select the best compute nodes to deploy the pattern when the physical and virtual resources of the cloud computing environment are extremely large and geographically dispersed in accordance with an embodiment of the present invention.

FIG. 4 illustrates a hierarchical arrangement 400 of tiers that is utilized to select the best compute nodes 302 to deploy the pattern when the physical and virtual resources of the cloud computing environment are extremely large and geographically dispersed in accordance with an embodiment of the present invention.

Referring to FIG. 4, hierarchical arrangement 400 includes a first or a top level tier 401 that is identified as the "domain level" in FIG. 4. Domain tier 401 includes a region referred to herein as the "domain" 404. Domain 404 includes multiple regions of sub-domains 405 at the sub-domain tier 402 and each sub-domain 405 of the sub-domain tier 402 includes multiple racks 301 (FIG. 3) at the rack tier 403. In the example depicted in FIG. 4, domain 404 may refer to the region that contains one or more sites or sub-domains 405 of the sub-domain tier 402, where each of the sites contains one or more racks 301, where each rack 301 contains compute node(s) 302 as well as other hardware, such as storage, data and storage switches and links. While FIG. 4 illustrates three tiers, hierarchical arrangement 400 may include any number of levels or tiers.

Referring now to FIG. 3, in conjunction with FIG. 4, each of the tiers in hierarchical arrangement 400 may be associated with a placement engine configured to select the regions within the next lower tier to place the virtual machine instance(s) of the pattern as discussed in further detail below. For example, as illustrated in FIG. 3, placement engine 306 includes a domain placement engine 307 configured to select the sub-domains 405 of sub-domain tier 402 into which to place the virtual machine instance(s) of the pattern based on the placement polices and constraints at sub-domain tier 402 and availability of the artifacts required by the virtual machine instance(s) at sub-domain tier 402 as discussed further below. Domain placement engine 307 does not select the specific rack(s) 301 or the specific compute node(s) 302 to place the virtual machine instance(s) of the pattern. Furthermore, placement engine 306 further includes a sub-domain placement engine 308 configured to select the racks 301 into which to place the virtual machine instance(s) of the pattern based on the placement polices and constraints at rack tier 403 and availability of the artifacts required by the virtual machine instance(s) at rack tier 403 as discussed further below. Additionally, placement engine 306 further includes a rack placement engine 309 configured to select the compute nodes 302 into which to place the virtual machine instance(s) of the pattern based on the placement polices and constraints at the compute node level and availability of the artifacts required by the virtual machine instance(s) at the compute node level as discussed further below.

Placement engines 307-308 of placement engine 306 may select the region(s) of the next lower tier to place the virtual machine instance(s) of the pattern utilizing the resource usage and availability at the next lower tier. Placement engines 308-309 of placement engine 306 provide the summarization of the resource usage and availability at the current tier to placement engine 307, 308, respectively, at the next higher tier as discussed further below. For example, rack placement engine 309 may summarize the resource usage and availability at rack tier 403 as opposed to summarizing the resource usage and availability for each compute node 302. In one embodiment, rack placement engine 309 summarizes the resource usage and availability for the "host aggregate." The "host aggregate," as used herein, refers to an arbitrary collection of compute nodes 302, which may all be on the same rack 301 or span across more than one rack 301. As a result, rack placement engine 309 may summarize the resource usage and availability of the computing resources (e.g., processing usage, memory usage, storage usage, data bandwidth, storage bandwidth) that is reserved for the virtual machine instances in that host aggregate. Rack placement engine 309 may then send the summarization of the resource usage and availability at rack tier 403, such as for the host aggregate, to the next higher tier, such as to sub-domain placement engine 308. Sub-domain placement engine 308 utilizes the resource usage and availability at rack tier 403 to select the racks 301 into which to place the virtual machine instance(s) of the pattern as discussed further below.

Similarly, sub-domain placement engine 308 summarize the resource usage and availability at the sub-domain tier 402 and sends the summarization of the resource usage and availability at the sub-domain tier 402 to the next higher tier, such as to domain placement engine 309. In one embodiment, sub-domain placement engine 308 reports the resource usage and availability for each region of sub-domain tier 402 to domain placement engine 309. Domain placement engine 309 utilizes the summarization of the resource usage and availability at sub-domain tier 402 to select the region(s) 405 of sub-domain tier 402 into which to place the virtual machine instance(s) of the pattern.

Figure 5:
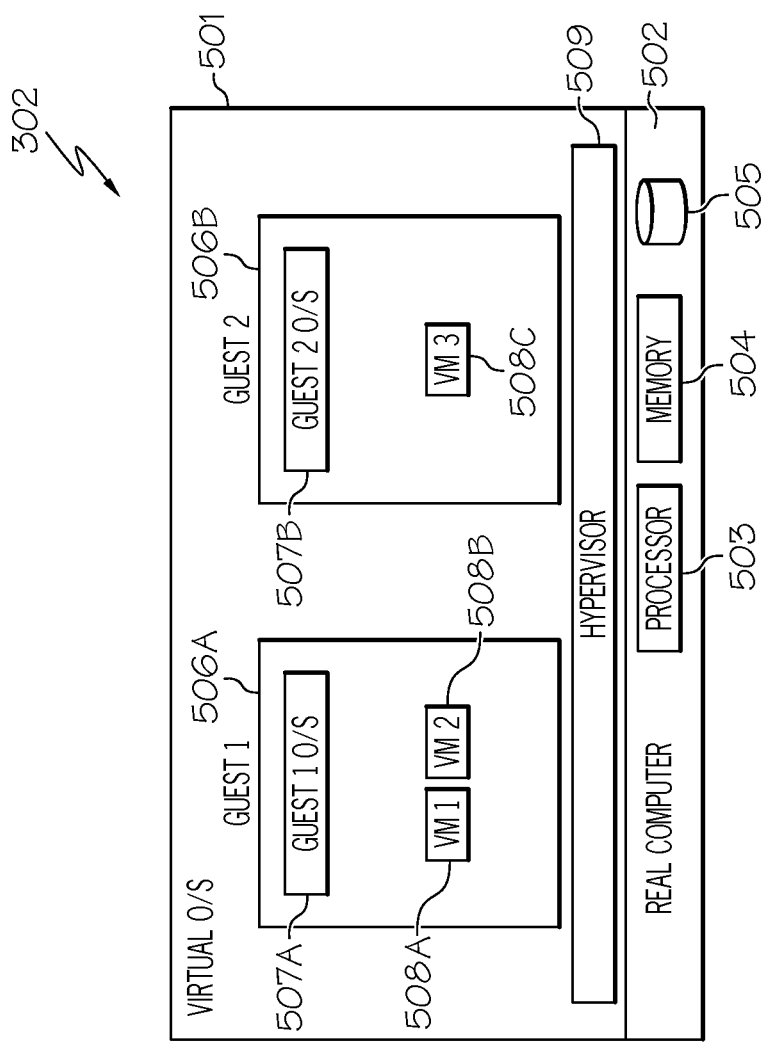
FIG. 5 illustrates a virtualization environment for a compute node in accordance with an embodiment of the present invention.

Referring now to FIG. 5, FIG. 5 illustrates a virtualization environment for compute node 302 (FIG. 3) in accordance with an embodiment of the present invention. Compute node 302 includes a virtual operating system 501. Operating system 501 executes on a real or physical computer 502. Real computer 502 includes one or more processors 503, a memory 504 (also referred to herein as the host physical memory), one or more disk drives 505 and the like. Other components of real computer 502 are not discussed herein for the sake of brevity.

Virtual operating system 501 further includes user portions 506A-506B (identified as "Guest 1" and "Guest 2," respectively, in FIG. 5), referred to herein as "guests." Each guest 506A, 506B is capable of functioning as a separate system. That is, each guest 506A-506B can be independently reset, host a guest operating system 507A-507B, respectively, (identified as "Guest 1 O/S" and "Guest 2 O/S," respectively, in FIG. 5) and operate with different programs. An operating system or application program running in guest 506A, 506B appears to have access to a full and complete system, but in reality, only a portion of it is available. Guests 506A-506B may collectively or individually be referred to as guests 506 or guest 506, respectively. Guest operating systems 507A-507B may collectively or individually be referred to as guest operating systems 507 or guest operating system 507, respectively.

Each guest operating system 507A, 507B may host one or more virtual machine applications 508A-508C (identified as "VM 1," "VM 2" and "VM 3," respectively, in FIG. 5), such as Java™ virtual machines. For example, guest operating system 507A hosts virtual machine applications 508A-508B. Guest operating system 507B hosts virtual machine application 508C. Virtual machines 508A-508C may collectively or individually be referred to as virtual machines 508 or virtual machine 508, respectively.

Virtual operating system 501 further includes a common base portion 509, referred to herein as a hypervisor. Hypervisor 509 may be implemented in microcode running on processor 503 or it may be implemented in software as part of virtual operating system 501. Hypervisor 509 is configured to manage and enable guests 506 to run on a single host.

As discussed above, virtual operating system 501 and its components execute on physical or real computer 502. These software components may be loaded into memory 504 for execution by processor 503.

The virtualization environment for compute node 302 is not to be limited in scope to the elements depicted in FIG. 5. The virtualization environment for compute node 302 may include other components that were not discussed herein for the sake of brevity.

Figure 6:
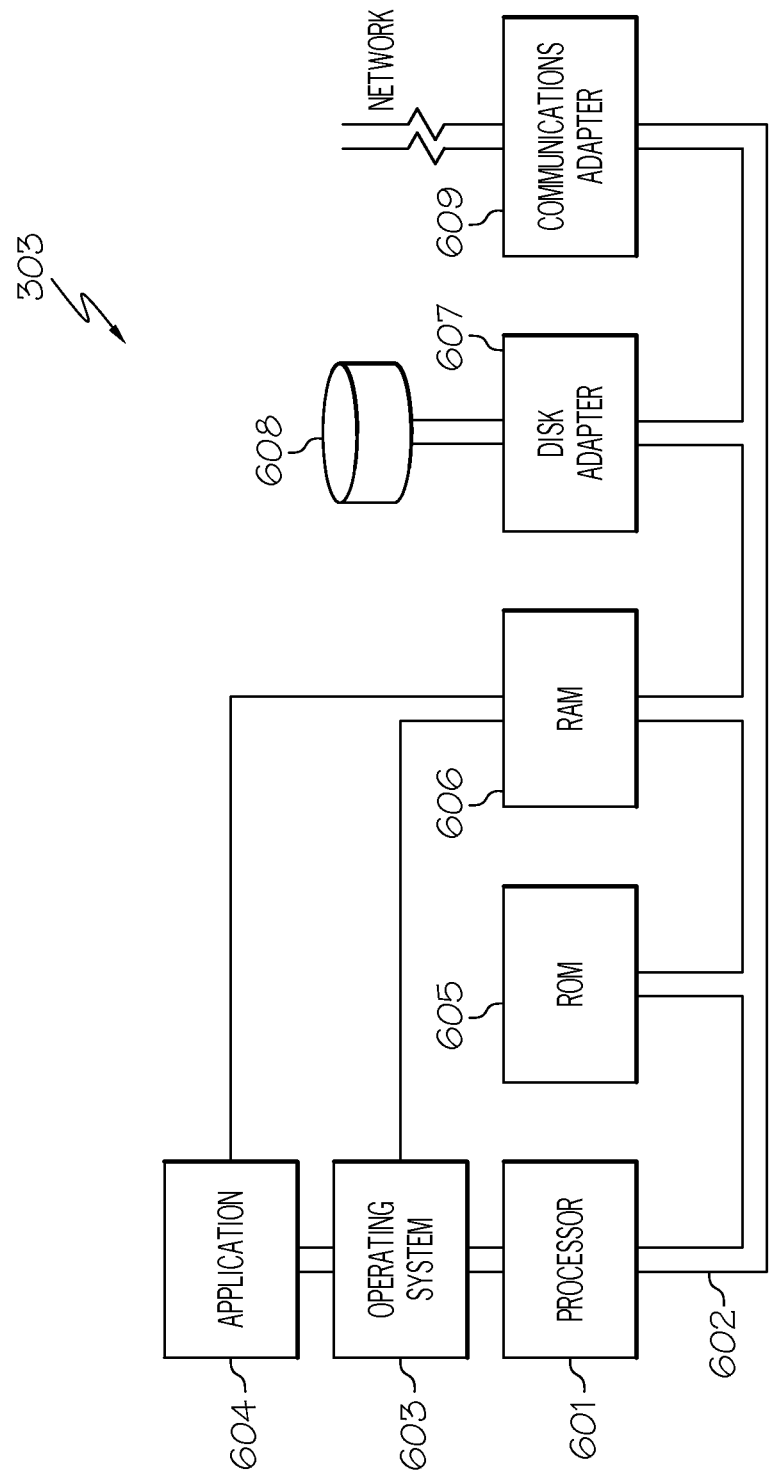
FIG. 6 illustrates a hardware configuration of an administrative server configured in accordance with an embodiment of the present invention.

Referring now to FIG. 6, FIG. 6 illustrates a hardware configuration of administrative server 303 (FIG. 3) which is representative of a hardware environment for practicing the present invention. Administrative server 303 has a processor 601 coupled to various other components by system bus 602. An operating system 603 runs on processor 601 and provides control and coordinates the functions of the various components of FIG. 6. An application 604 in accordance with the principles of the present invention runs in conjunction with operating system 603 and provides calls to operating system 603 where the calls implement the various functions or services to be performed by application 604. Application 604 may include, for example, a program (e.g., management software 304 of FIG. 3) for effectively deploying a pattern when the physical and virtual resources of the cloud computing environment are extremely large and geographically dispersed by utilizing a hierarchical arrangement 400 (FIG. 4) of tiers as discussed further below in connection with FIGS. 7 and 8A-8B.

Referring again to FIG. 6, read-only memory ("ROM") 605 is coupled to system bus 602 and includes a basic input/output system ("BIOS") that controls certain basic functions of administrative server 303. Random access memory ("RAM") 606 and disk adapter 607 are also coupled to system bus 602. It should be noted that software components including operating system 603 and application 604 may be loaded into RAM 606, which may be administrative server's 303 main memory for execution. Disk adapter 607 may be an integrated drive electronics ("IDE") adapter that communicates with a disk unit 608, e.g., disk drive. It is noted that the program for effectively deploying a pattern when the physical and virtual resources of the cloud computing environment are extremely large and geographically dispersed by utilizing a hierarchical arrangement 400 of tiers, as discussed further below in connection with FIGS. 7 and 8A-8B, may reside in disk unit 608 or in application 604.

Administrative server 303 may further include a communications adapter 609 coupled to bus 602. Communications adapter 609 interconnects bus 602 with an outside network (e.g., network 103 of FIG. 1).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, an administrator of the cloud computing environment may build a reusable pattern which defines the topology and application environment used to service the customer (i.e., the user receiving the services provided by the cloud computing environment) as well as satisfies the customer requirements, such as application and processing requirements. The pattern is an abstract model of the topology and application environment that encapsulates the installation, configuration and management of middleware and applications, such as the middleware and applications that run on the virtual machines in the physical cloud computing nodes. Such a pattern can be deployed repeatedly thereby avoiding the need to provision these environments individually and manually. Currently, such a pattern is deployed to compute nodes (e.g., servers) of the cloud computing nodes by a placement engine. The placement engine is configured to select the "best" compute nodes to deploy the pattern, such as the compute nodes to place the virtual machine instances of the pattern. Typically, the placement engine selects the best compute nodes to deploy the pattern utilizing the known state of the physical and virtual resources in the cloud computing environment. However, such an approach is not effective when the physical and virtual resources of the cloud computing environment are extremely large and geographically dispersed since it will become impossible for the placement engine to know the state of the physical and virtual resources in such a cloud computing environment.

Figure 7:
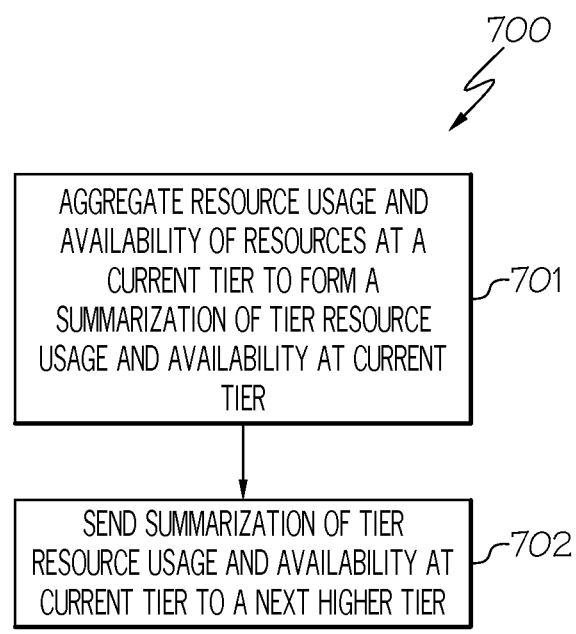
FIG. 7 is a flowchart of a method for reporting resources available to the next higher tier in accordance with an embodiment of the present invention.
Figure 8A:
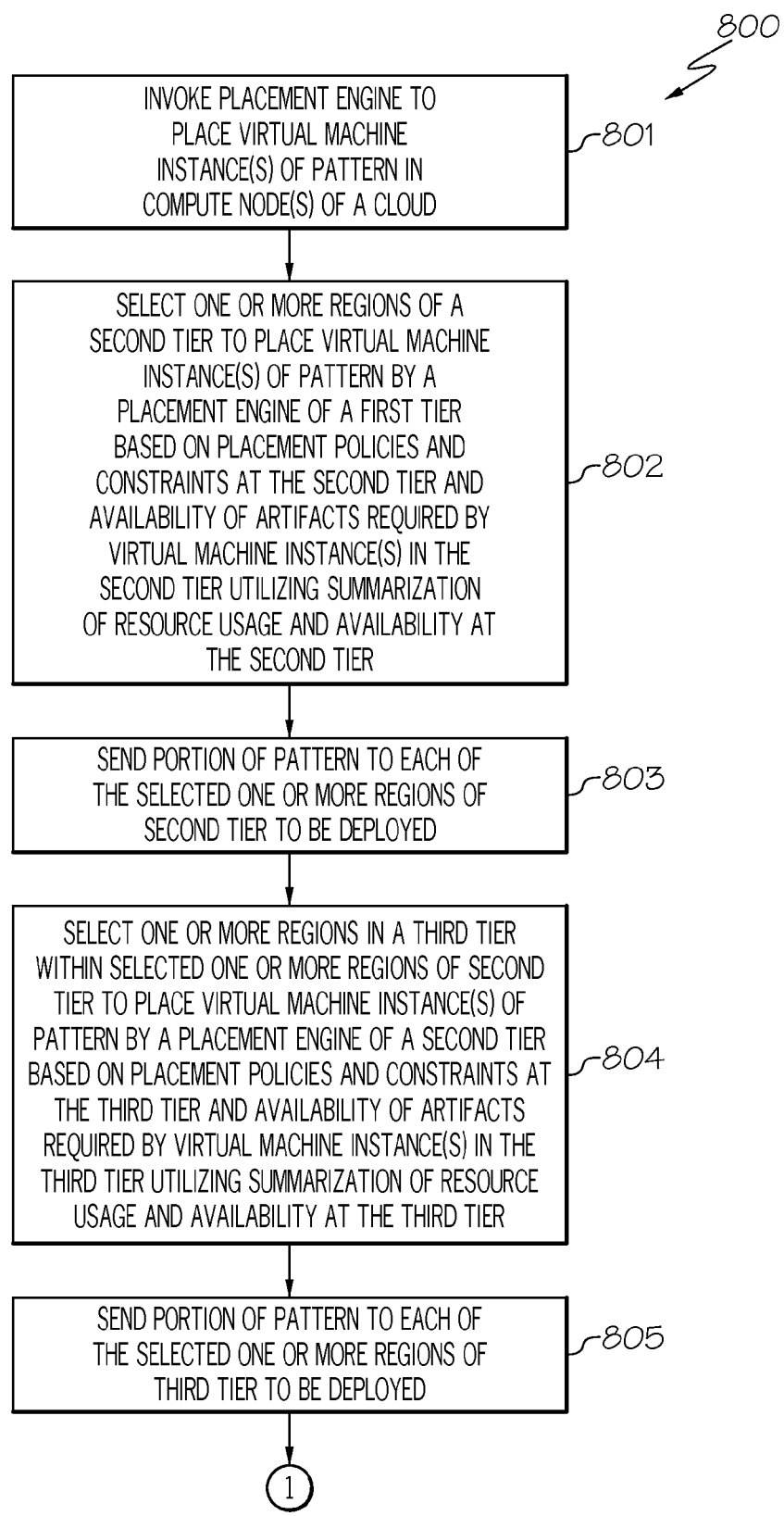
FIGS. 8A-8B are a flowchart of a method for deploying the virtual machine instance(s) of a pattern to the compute node(s) in accordance with an embodiment of the present invention.
Figure 8B:
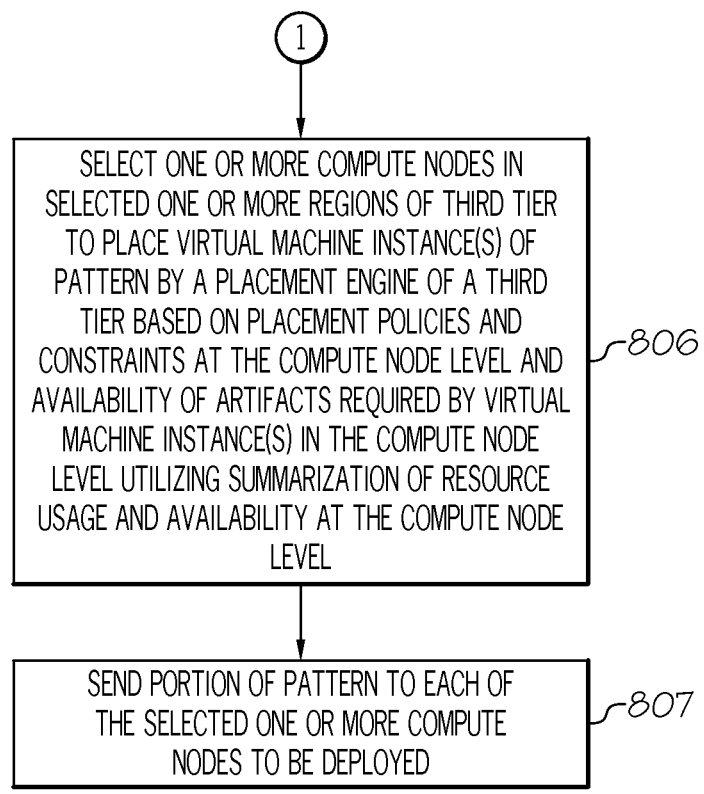

The principles of the present invention provide a means for effectively deploying a pattern when the physical and virtual resources of the cloud computing environment are extremely large and geographically dispersed utilizing a hierarchical arrangement 400 (FIG. 4) of tiers as discussed below in association with FIGS. 7 and 8A-8B. FIG. 7 is a flowchart of a method for reporting resources available to the next higher tier. FIGS. 8A-8B are a flowchart of a method for deploying virtual machine instance(s) of a pattern to the compute node(s) 302 (FIG. 3).

As discussed above, FIG. 7 is a flowchart of a method 700 for reporting resources available to the next higher tier in accordance with an embodiment of the present invention. As discussed above, the placement engines at the tiers of hierarchical arrangement 400 (FIG. 4), such as placement engines 307-308 of placement engine 306 (FIG. 3), may select the regions of the next lower tier to place the virtual machine instance(s) 508 of the pattern utilizing the resource usage and availability at the next lower tier, where a summary of such resource usage and availability is provided to them by the placement engine of the next lower tier as discussed below in connection with FIG. 7.

Referring to FIG. 7, in conjunction with FIGS. 1-6, in step 701, placement engines 309, 308 aggregate the resource usage and availability of the computing resources (e.g., processing usage, memory usage, storage usage, data bandwidth, storage bandwidth) at the current tier (rack tier 403 and sub-domain tier 402, respectively) to form a summarization of the tier resource usage and availability at the current tier.

In step 702, placement engines 309, 308 send the summarization of the tier resource usage and availability at the current tier to the next higher tier (sub-domain tier 402 and domain tier 401, respectively). That is, placement engines 309, 308 send the summarization of the tier resource usage and availability at the current tier to placement engine 308, 307, respectively, of the next higher tier. Placement engines 307, 308 then utilize the resource usage and availability at the next lower tier to select the region(s) in the next lower tier to place the virtual machine instance(s) 508 of a pattern. A discussion regarding deploying virtual machine instance(s) 508 of a pattern to compute nodes 302 utilizing the resource usage and availability at the next lower tier is discussed below in connection with FIGS. 8A-8B.

FIGS. 8A-8B are a flowchart of a method 800 for deploying virtual machine instance(s) 508 (FIG. 5) of a pattern to compute node(s) 302 (FIG. 3) in accordance with an embodiment of the present invention.

Referring to FIG. 8A, in conjunction with FIGS. 1-7, in step 801, pattern engine 305 invokes placement engine 306 to place the virtual machine instance(s) 508 of a pattern in compute nodes 302.

In step 802, domain placement engine 307 selects one or more regions 405 of a second tier, such as sub-domain tier 402, to place the virtual machine instance(s) 508 of a pattern based on the placement policies and constraints at the second tier and availability of the artifacts required by the virtual machine instance(s) 508 in the second tier utilizing the summarization of resource usage and availability at the second tier. For example, domain placement engine 307 selects one or more regions 405 of sub-domain tier 402 with sufficient resource availability (e.g., processing usage, memory usage, storage usage, data bandwidth, storage bandwidth) and artifacts required to support the virtual machine instance(s) 508 of a pattern while honoring the placement policies and constraints specified by the user.

In step 803, pattern engine 305 sends a portion of the pattern to each of the selected one or more regions 405 of a second tier to be deployed.

In step 804, sub-domain placement engine 308 selects one or more racks 301 in a third tier, such as rack tier 403, to place the virtual machine instance(s) 508 of a pattern based on the placement policies and constraints at the third tier and availability of the artifacts required by the virtual machine instance(s) 508 in the third tier utilizing the summarization of resource usage and availability at the third tier.

In step 805, pattern engine 305 sends a portion of the pattern to each of the selected one or more racks 301 of a third tier to be deployed.

Referring now to FIG. 8B, in conjunction with FIGS. 1-7, in step 806, rack placement engine 309 selects one or more compute nodes 302 in the selected one or more regions or racks 301 of the third tier, such as rack tier 403, to place the virtual machine instance(s) 508 of a pattern based on the placement policies and constraints at the compute node level and availability of the artifacts required by the virtual machine instance(s) 508 in the compute node level utilizing the summarization of resource usage and availability at the compute node level. For example, rack placement engine 309 identifies every virtual machine instance 508 that is currently deployed to each compute node 302 within each rack 301 and the computing resources (e.g., processing usage, memory usage, storage usage, data bandwidth, storage bandwidth) utilized by each virtual machine instance 508. Rack placement engine 309 may utilize such information to select compute nodes 302 to place the virtual machine instance(s) 508 of the pattern.

In step 807, pattern engine 305 sends a portion of the pattern to each of the selected one or more compute nodes 302 to be deployed.

In this manner, a pattern, including the virtual machine instances of the pattern, can be effectively deployed when the physical and virtual resources of the cloud computing environment are extremely large and geographically dispersed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for deploying a pattern, the method comprising:

invoking, by a processor, a placement engine to place one or more virtual machine instances of said pattern in one or more compute nodes of a cloud computing environment;

selecting, by said processor, one or more regions in a second tier within one or more regions in a first tier to place said one or more virtual machine instances of said pattern based on placement policies and constraints at said second tier and availability of artifacts required by said one or more virtual machine instances of said pattern in said second tier;

sending, by said processor, a portion of said pattern to each of said selected one or more regions in said second tier to be deployed;

selecting, by said processor, one or more regions in a third tier within said selected one or more regions in said second tier to place said one or more virtual machine instances of said pattern based on placement policies and constraints at said third tier and availability of artifacts required by said one or more virtual machine instances of said pattern in said third tier;

sending, by said processor, a portion of said pattern to each of said selected one or more regions in said third tier to be deployed;

selecting, by said processor, one or more compute nodes in said selected one or more regions in said third tier to place said one or more virtual machine instances of said pattern based on placement policies and constraints at a compute node level and availability of artifacts required by said one or more virtual machine instances of said pattern in said compute node level; and sending, by said processor, a portion of said pattern to each of said selected one or more compute nodes to be deployed.

2. The method as recited in claim 1 further comprising:

selecting said one or more regions in said second tier within said one or more regions in said first tier to place said one or more virtual machine instances of said pattern by a placement engine of a first tier of said placement engine;

selecting said one or more regions in said third tier within said selected one or more regions in said second tier by a placement engine of a second tier of said placement engine; and selecting said one or more compute nodes in said selected one or more regions in said third tier to place said one or more virtual machine instances of said pattern by a placement engine of a third tier of said placement engine.

3. The method as recited in claim 1, wherein said one or more regions in said second tier comprises one or more sub-domains of a domain of said first tier, and wherein said one or more regions in said third tier comprises one or more racks of said one or more sub-domains of said second tier.

4. The method as recited in claim 1 further comprising:

aggregating resource usage and availability of resources of a current tier to form a summarization of tier resource usage and availability at said current tier; and sending said summarization of said tier resource usage and availability at said current tier to a next higher tier.

5. The method as recited in claim 4 further comprising:

selecting said one or more regions in said second tier within said one or more regions in said first tier to place said one or more virtual machine instances of said pattern utilizing a summarization of resource usage and availability at said second tier;

selecting said one or more regions in said third tier within said selected one or more regions in said second tier utilizing a summarization of resource usage and availability at said third tier; and selecting said one or more compute nodes in said selected one or more regions in said third tier utilizing a summarization of resource usage and availability at said compute node level.

6. The method as recited in claim 1, wherein said placement policies comprise placement restrictions for said one or more virtual machine instances of said pattern.

7. The method as recited in claim 1, wherein said constraints define relationships between various virtual machines in said pattern, and wherein said defined relationships determine whether said various virtual machines in said pattern are to be collocated or anti-collocated with respect to each other.

* * * * *